March 11, 1969     F. J. ZAVASNIK     3,432,579
PROCESS FOR PRODUCING LOW-DENSITY PELLETS FROM SLURRIES
CONTAINING FILM-FORMING MATERIALS
Filed July 11, 1966

INVENTOR
F. J. ZAVASNIK
BY *Young and Quigg*

ATTORNEYS

United States Patent Office 3,432,579
Patented Mar. 11, 1969

3,432,579
PROCESS FOR PRODUCING LOW-DENSITY PELLETS FROM SLURRIES CONTAINING FILM-FORMING MATERIALS
Fred J. Zavasnik, Bartlesville, Okla., assignor to Phillips Petroleum Company, a corporation of Delaware
Filed July 11, 1966, Ser. No. 564,406
U.S. Cl. 264—14           4 Claims
Int. Cl. C08f 47/10; C08g 53/08; B22d 23/08

ABSTRACT OF THE DISCLOSURE

A pressurized solution of a volatile solvent and a film-forming polymeric material is cooled to form a slurry; the slurry is subdivided into individual pellets having solvent entrapped therein; the solvent at the surface of the pellets is partially vaporized to produce a self-sustaining structure; the pellets are then dried in a fluidizing medium to cause surface shrinkage resulting in the bursting of the pellets; and blown low-density pellets are recovered.

This invention relates to a method for producing low-density pellets from a slurry of film-forming material. In one aspect this invention relates to a method for producing hollow pellets from a solution of a film-forming material dissolved in a solvent compatible therewith and precipitated by cooling to form a precipitated polymer-solvent slurry. In another aspect this invention relates to a fluidized drying system for producing low-density polyethylene pellets. In yet another aspect the invention relates to a method for producing a resinous material having a low bulk density. In yet another aspect this invention relates to novel low-density pellets composed of film-forming material.

The formation of particles by the solution polymerization of film-forming materials is well known under the prior art. A solution polymerization is defined as the polymerization of a monomer, wherein the monomer is dispersed in a solvent different from the monomer employed but nevertheless compatible therewith for dissolving the formed polymer. In such systems, the polymer is recovered from the solution through cooling and depressurization whereby the solvent is flashed therefrom. If the depressurization is sufficiently low and no atomization occurs, the polymer product foams and cools into a mass of honeycomb or cellular type material which is difficult to process. In such a system it has heretofore been quite difficult to prepare polymer particles having a low bulk density. Such a low bulk density material would be useful as in a pourable insulation, as additives to paper slurry in the paper-making industry and as additives in foamed sheets and in insulated products.

It therefore is an object of the present invention to provide a method for producing separate and discrete low-density pellets which have a thin strong skin and which are formed from a film-forming material.

It is a further object of this invention to provide a novel fluidized drying system for producing low-density pellets of polyethylene.

It is a still further object of this invention to provide a method for forming low bulk density resinous material.

Yet another object of this invention is to provide a low bulk density resinous material.

Other objects and many of the attendant advantages of this invention will be readily appreciated as the same become better understood by reference to the following detailed description which is to be considered in connection with the accompanying drawings wherein.

Figure 1:
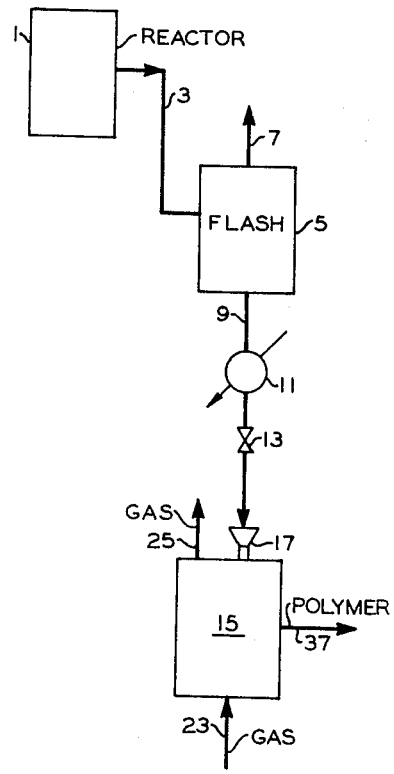
FIGURE 1 is a schematic description of the various steps of my process.

Briefly, this invention comprises the steps of forming a pressurized solution comprising a volatile solvent having dissolved therein film-forming polymeric material; cooling the polymer solution to cause precipitation of polymeric film-forming material from the solution thereby forming a slurry; subdividing the said slurry of film into pellets; subjecting the pellets to a drying temperature for a time sufficient to cause partial volatilization of the said solvent from the pellets at their surface to produce a self-sustaining structure; and drying the pellets in a fluidized medium at a temperature sufficient to cause shrinkage along their outer surfaces, thereby causing the pellets to burst because of the vaporization of the solvent entrapped therein, and recovering the dried pellets of polymeric material.

The invention is applicable to the formation of spheroidal-shaped particles which can be obtained from any natural or synthetic film-forming material that is soluble in either an acidic, alkaline or neutral aqueous solution or in an organic solvent; that can form a solution whose viscosity is sufficiently low to permit subdivision into small pellets; that can be capable of gelling on evaporation of solvent therefrom to form a relatively tough gas-impermeable skin or film.

The term "film-forming material" is used herein to refer to film-forming materials as a class. The organic materials include cellulose derivatives, such as cellulose acetate, cellulose acetate-butyrate, and cellulose acetate-propionate, thermoplastic synthetic resins, such as polyvinyl resins, i.e. polyvinyl alcohol (water- or organic solvent-soluble), polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins, and thermosetting resins in the thermoplastic water- or organic solvent-soluble stage of partial polymerization, the resins being converted after or during formation of the particles into a more or less fully polymerized solvent-insoluble stage, such as alkyl, alkyd, polysiloxane, phenyl-formaldehyde, urea-formaldehyde and melamine-formaldehyde resins. All these resins are film-forming and therefore capable of forming tough-skinned particles. Natural film-forming materials are also included in the scope of the general term including soybean protein, zein protein, alginates, and cellulose in solution as cellulose xanthate or cuprammonium cellulose. Inorganic film-forming substances such as the sodium silicates, polyborates and polyphosphates are also contemplated as within the scope of the above term.

The solvent employed will, of course, be dictated by the solubility of the film-forming material used. The solvent should, upon evaporation, be conducive to gelation of the material, so that a tough skin is quickly formed over the surface of the pellet. Water, alcohols, ethers, esters, organic acids, hydrocarbons and chlorinated hydrocarbons are the most noteworthy satisfactory solvents.

More particularly, the polymers applicable to this invention are homopolymers and copolymers of two or more 1-olefins having no branching nearer the double bond than the 4-position, preferably having from 2 to 8 carbon atoms per molecule, which have a specific gravity of at least 0.94 at 20° C.

Examples of such 1-olefins include ethylene, propylene, 1-butene, 1-pentene, 1-hexene, 1-octene, 4-methyl-1-pentene, 4-methyl-1-hexene, 4-ethyl-1-hexene, 6-methyl-1-heptene, 5-methyl-1-heptene.

The preferred solvents employed in forming the solutions of this invention are generally hydrocarbons, preferably paraffins and/or cycloparaffins, having from 3 to 12 carbon atoms per molecule. Generally, any hydrocarbon which is relatively inert, non-deleterious, liquid under the conditions of operation of the polymerization process, and more importantly, a solvent for the polymer formed, can be utilized.

Examples of such solvents include propane, isobutane, normal pentane, iso-pentane, isooctane (2,2,4-trimethylpentane), cyclohexane, methylcyclohexane. The solutions of this invention will generally contain from about 1 to 20, preferably from about 5 to about 12, weight percent polymeric film-forming material based upon the total weight of the solution.

As stated hereinabove, any polymerization process which forms a solution which is capable of gelling on evaporation to form a relatively tough, gas-impermeable skin or film is suitable for this process. A preferred mode of carrying out the process of this invention is illustrated in FIGURE 1. A solution of polyethylene dissolved in cyclohexane is prepared in reactor 1 according to the process described in U.S. Patent 2,825,721. This reaction solution is transferred via conduit 3 to a flashing zone 5 wherein any unreacted ethylene is flashed from the reaction solution through conduit 7 and recycled back to the reactor feed (not shown). Generally, the temperature of the polymer solution in reactor 1 is maintained at from about 200° to about 400° F. and a pressure of from about 350 to about 550 p.s.i.g. The polyethylene solution passes from the flash zone 5 via conduit 9 through a pressurized cooling means 11 into an intermittent pressure letdown valve means 13.

Cooling means 11 can be a jacketed ½- to 2-inch diameter pipe from 10 to 60 or more feet long which has cooling liquid such as water passing through its jacket. The temperature in cooling means 11 is maintained such that the polymer solution passing through is cooled at least to the temperature at which precipitation of polymer from the solution starts, i.e., a temperature at which polymer is no longer readily soluble in the solvent. Although this temperature can vary depending upon the polymer, the solution, or the concentration of polymer in the solvent, it will generally be in the range of from about 190 to about 230° F. The pressure in cooling means 11 will be maintained sufficiently elevated so that substantial vaporization of the solvent is prevented but lower than the pressure in the reactor 1 so that the pressure in that container is the motivating force for movement of the material through the cooling means 11. This pressure can vary widely but generally will be from about 200 to about 300 p.s.i.g.

The pressure letdown means 13 can be a conventional metering device in which a fixed amount to material is allowed periodically to pass therethrough. Such a metering device is fully and completely disclosed in U.S. Patent 3,167,398, which employs the captive ball concept wherein a chamber is provided having inlet and outlet orifices at opposite ends thereof and through which the polymer slurry from reactor 1 must pass in order to reach the generally cylindrical and upright initial drying zone 15. This zone 15 is maintained at a temperature and pressure sufficiently lower than cooling means 11 in order to cause vaporization of the solvent. Generally, the pressure in zone 15 is substantially or slightly less than atmospheric.

Figure 2:
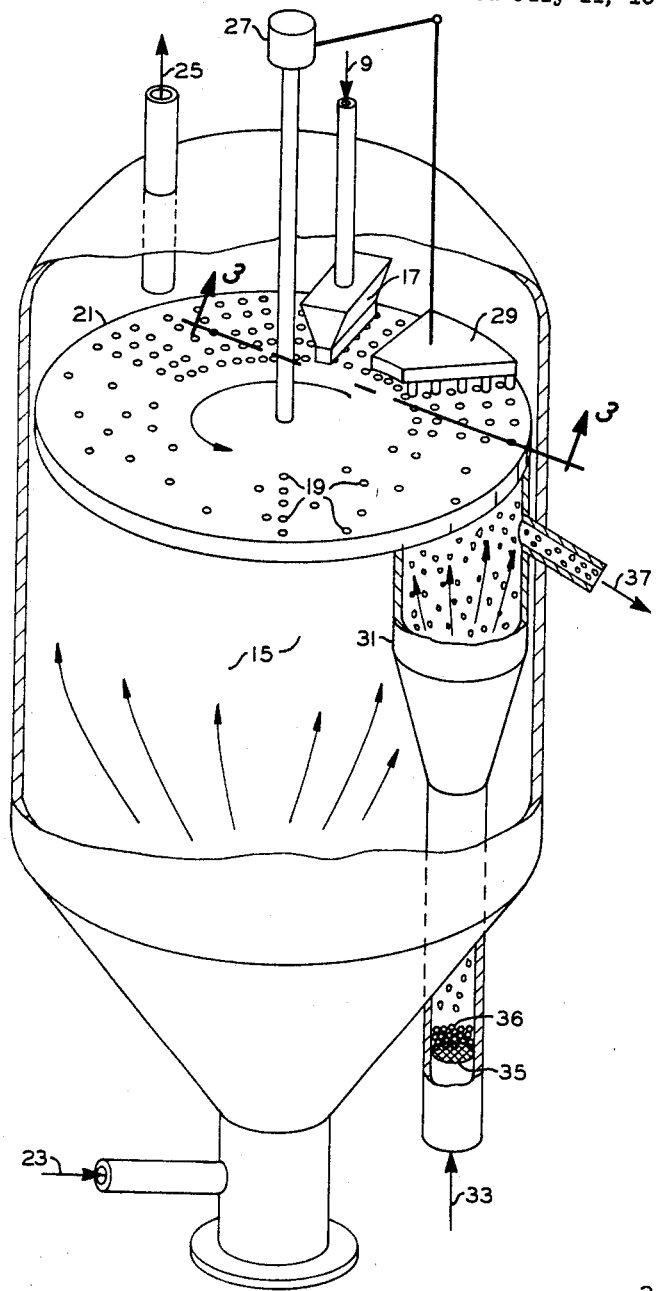
FIGURE 2 is a perspective view of the novel fluidized drying apparatus.
Figure 3:
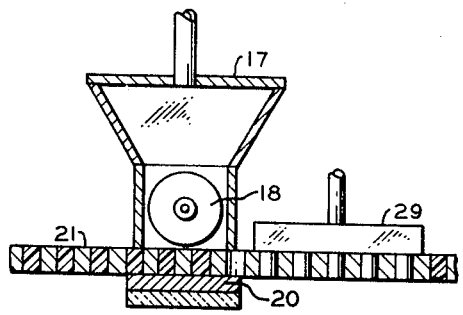
FIGURE 3 is a section taken along the lines 3—3.

With reference to FIGURES 2 and 3, wherein the fluidized drying zone is shown in greater detail, the precipitated slurry is passed from the letdown valve 13 via conduit 9 into a hopper 17 which is positioned in the top of zone 15. The hopper contains a spreading means 18 for spreading the precipitated slurry into a plurality of mold cavities 19 which extend through a drying plate 21 positioned underneath the hopper. This spreading means can be any conventional device such as a roller, a scraper, etc.

A drying fluid is passed via conduit 23 up through the initial drying zone 15 and passes through the material in the mold cavities 19 in the top of drying plate 21 and out through the exhaust conduit 25. Any drying fluid which is inert towards the precipitated polymer, i.e., air, nitrogen, ethylene, or the like, can be employed for this drying operation. The drying fluid is maintained at a temperature substantially around 210° F. A baffle means 20 is positioned underneath the hopper 17 to prevent the drying fluid from passing up into the hopper and to prevent the polymer slurry from falling out of the mold cavities 19 during the loading thereof.

The drying plate 21 is rotated in incremental steps from the filler position underneath the hopper to an ejection position underneath a pellet ejector mechanism 29 in a time period sufficient to evaporate the solvent from the exposed surface of the pellets. As the pellets are dried, they tend to shrink thereby permitting circulation of the drying medium through the mold cavities 19. This period will depend on the particular solvents and film forming materials employed but will usually range from 2–10 minutes. This time rotation of the drying plate is controlled by a timing and indexing means 27 which is also operatively connected to the pellet ejector 29 whereby the partially dried pellets are pushed into a chamber 31, which forms a closed section of cylindrical drying zone 15. Chamber 31 is provided with heating means (not shown) which may be of any suitable nature for pulsing a fluid medium, which can be the same as described hereinabove, through conduit 33 and upwardly through closed chamber 31. The temperature of this fluidized medium is adjusted according to the stability and softening point of the particular film-forming material, the size of the pellets produced, and the stability of the solvent employed. However, as those skilled in the art appreciate, because the cooling effect of evaporation, a very high temperature may be used without injury to low-melting or easily decomposable materials. As the pellets are introduced into the chamber 31 from the conduits in plate 21, they begin to swell and become more buoyant. As they become more buoyant, they are carried gradually upwardly in the turbulence produced by pulsing the flow of drying medium in chamber 31. The pellets are thus caused to rise progressively in the chamber 31 until they reach the level of the chamber at which they find the outlet 37. The pellets then exit through the outlet and are recovered by suitable recovery means not shown.

In order to keep the pellets from falling to the bottom of chamber 34, the diameter of the chamber is smaller at the bottom than at the top and glass beads 36, which prevent the pellets from adhering together during the initial stages of fluidized drying, are positioned on a 40-mesh 0.1 Standard screen 35 at the point where chamber 31 is joined with conduit 33.

The following example is offered to further illustrate the invention.

EXAMPLE

A solution comprising cyclohexane containing 8 weight percent polyethylene, based upon the total weight of the solution, and having a density of 0.96 and a melt index of 0.2 was passed from reactor 1 via conduit 3 into a flash zone 5 where unreacted ethylene was flashed through conduit 7. The polyethylene-cyclohexane solution was then passed via conduit 9 through cooling means 11 which was composed of a ½-inch diameter copper tubing about 20 feet long. This tubing had a water jacket thereabout through which was circulated cooling water at a temperature of about 70° F. The polyethylene polymer precipitated from the solution and formed a slurry. The polyethylene slurry was passed from cooling means 11 via conduit 9 into a pressure letdown valve 13 which permitted the passage of about 9 pounds per hour of slurry through conduit 9 into the hopper 17 of the top zone 15. The slurry was spread into the mold cavities 19 in drying plate 21. The drying plate was timed to rotate from the filling position under hopper 17 over to the ejector plate 29 in two-minute cycles. Drying air at a temperature of 210° F. was passed up through drying zone 15 and through the mold cavities 19 in plate 21. The partially dried pellets were ejected from the conduits 19 by ejector 29 into a chamber 31. A drying air at a temperature of 210° F. was pulsed upwardly through chamber 31 at a pulsation frequency of 60 cycles a second which was sufficient to agitate the pellets falling into chamber 31. This procedure was maintained at ten-minute intervals at which time the pellets had 0.3 percent solvent and a minimum bulk density of 6 pounds per cubic foot. The polyethylene pellets were blown into conduit 37 where they were collected.

I claim:

1. A method for producing blown low-density pellets from a film-forming material, said method comprises the steps of forming a pressurized solution consisting essentially of a volatile solvent having dissolved therein a film-forming polymeric material wherein the polymeric material is present in a range of from 1 to 20 weight percent based upon the total weight of the solution; cooling the polymer solution to form a slurry of said polymeric material; subdividing the slurry into individual pellets whereby solvent is entrapped therein; subjecting the pellets to a drying temperature for a time sufficient to cause volatilization of the solvent at the surface of said pellets; drying the pellets in a fluidized medium at a temperature sufficient to cause shrinkage along their outer surface thereby causing the pellets to burst because of the vaporization of the solvent entrapped therein, and recovering the dried pellets as a product of said method.

2. A method according to claim 1 including the step of depressurizing the slurry prior to the step of subdividing said slurry into individual pellets.

3. A method according ot claim 1 further characterized in that the solution consists essentially of a 1-olefin polymer which has no branching nearer the double bond than the 4-position, 2 to 8 carbon atoms per molecule and a specific gravity of at least 0.94 at 20° C. and a solvent selected from the group consisting of paraffins and cycloparaffins having from 3 to 12 carbon atoms per molecule and the temperature on the fluidized medium ranges from 210° to 230° F.

4. A method according to claim 3 further characterized in that polyethylene is dissolved in cyclohexane wherein the polyethylene is present in the range of from about 5 to about 12 weight percent based upon the total weight of the solution.

References Cited

UNITED STATES PATENTS

| 2,576,977 | 12/1951 | Stober | 264—13 |
| 2,617,169 | 11/1952 | Bodkin | 264—13 |
| 2,797,201 | 6/1957 | Veatch | 260—2.5 |
| 2,923,034 | 2/1960 | Dickie | 264—123 |
| 2,929,106 | 3/1960 | Snow | 260—2.5 |
| 3,014,246 | 12/1961 | Cook | 264—15 |
| 3,089,194 | 5/1963 | Goins | 18—475 |

FOREIGN PATENTS

| 743,866 | 1/1956 | Great Britain. |

ROBERT F. WHITE, *Primary Examiner.*

R. R. KUCIA, *Assistant Examiner.*

U.S. Cl. X.R.

264—5; 260—2.5; 18—1